April 11, 1967

W. F. LEONARD ETAL 3,313,181

TRANSMISSION CONTROL

Filed Oct. 30, 1961

INVENTORS
WILLIAM F. LEONARD
WAYNE R. HOWARD
BY
Kenneth C. Witt
ATTORNEY

April 11, 1967  W. F. LEONARD ETAL  3,313,181
TRANSMISSION CONTROL
Filed Oct. 30, 1961  5 Sheets-Sheet 5

INVENTORS
WILLIAM F. LEONARD
WAYNE R. HOWARD
BY Kenneth C. Witt
ATTORNEY

United States Patent Office 3,313,181
Patented Apr. 11, 1967

3,313,181
TRANSMISSION CONTROL
William F. Leonard and Wayne R. Howard, Jackson, Mich., assignors to Clark Equipment Company, a corporation of Michigan
Filed Oct. 30, 1961, Ser. No. 148,446
7 Claims. (Cl. 74—732)

This invention relates to control means for drive mechanisms comprising a hydrodynamic torque converter with a lock-up clutch and a gear type change speed transmission which is connected to the hydrodynamic torque converter by means of a disconnect clutch, and more specifically to means for interlocking the gear shift control lever, the lock-up clutch and the disconnect clutch of such a drive mechanism.

It is known to employ a hydrodynamic torque converter ahead of and in series with a gear type change speed transmission. Such a hydrodynamic torque converter automatically multiplies the torque and changes the speed ratio between the input and output of the complete drive mechanism in accordance with the load on such a drive mechanism, the torque multiplication increasing and the speed ratio, i.e., output speed divided by input speed, decreasing with an increase in load and vice versa. The gear transmission has a plurality of fixed ratios. The operation of the hydrodynamic torque converter in series with the gear transmission in effect converts each of the fixed ratios of the gear transmission to an infinite series of ratios dependent upon the torque multiplication and speed ratio ranges of the hydrodynamic torque converter.

If the gear transmission is of the synchronized type, that is, has the gears constantly in mesh, with synchronizing clutch means being provided to connect selective gears to their respective shafts in order to secure desired speed ratios, it is important to be able to disconnect the transmission from the torque converter during shifting of the gear transmission. This is important because, as is well known, such synchronizing clutch means of the commonly used types, have relatively low clutching capacity. They are adequate for synchronizing the shafts and gears in the gear transmission itself but they are not adequate for synchronizing large masses external to the gear transmission. It is therefore desirable to provide a disconnecting clutch between the torque converter and the transmission to disconnect such external masses and this may be desirably a fluid actuated multiple disc clutch. The fluid connection of the torque converter wheels aids in synchronizing the output shaft of the torque converter with the input shaft of a gear transmission and in absorbing shocks incident to the engagement of the multiple disc disconnect clutch under operating conditions. It is desirable to have such a disconnect clutch as small as possible both axially and circumferentially because of its location between the torque converter and the transmission.

It has been found desirable, in some applications, to provide the hydrodynamic torque converter in such a drive mechanism with a lock-up clutch, thereby providing means for by-passing the torque converter and producing a direct drive between the engine or other prime mover and the disconnect clutch and the gear transmission in order to eliminate in certain circumstances the fluid losses inherent in the torque converter. It is desirable to make certain that the lock-up clutch is disengaged when the disconnect clutch is re-engaged so that the torque converter will perform the functions of synchronization and shock absorption discussed previously. Therefore, it is a principal object of our invention to provide means for insuring that the lock-up clutch of the torque converter of such a drive mechanism is not engaged during shifting of the gear transmission and engagement of the disconnect clutch.

Also, when the gear transmission is in one of the higher gear ratios it may be desirable to have the torque converter in the drive line only long enough to aid in synchronization and absorb the shock load incident to shifting. Another object of our invention is to provide automatic means for reengaging the lock-up clutch after the disconnect clutch has been re-engaged when the gear transmission is in the higher gear ratios.

A further object of our invention is to provide a valve assembly wherein one of the valves can occupy a certain position only when the other valve occupies a similar position.

In carrying out our invention in one preferred embodiment we provide an air valve actuated by a shift rail of the gear transmission for energizing or de-energizing a spring return diaphragm actuator which in turn actuates a spool valve for controlling the lock-up clutch. The spool valve for controlling the lock-up clutch is connected to a spool valve for controlling the disconnect clutch by means of a pin and wipe slot assembly so that the lock-up clutch is in its disengaged position whenever the disconnect clutch is in its disengaged position. Also, the fluid circuitry for engaging the clutches is such that the lock-up clutch lags behind the disconnect clutch in speed of engagement.

The above objects and other objects, features and advantages of our invention will be more readily apparent to persons skilled in the art from the following detailed description when taken in conjunction with the accompanying drawing wherein.

Figure 1:
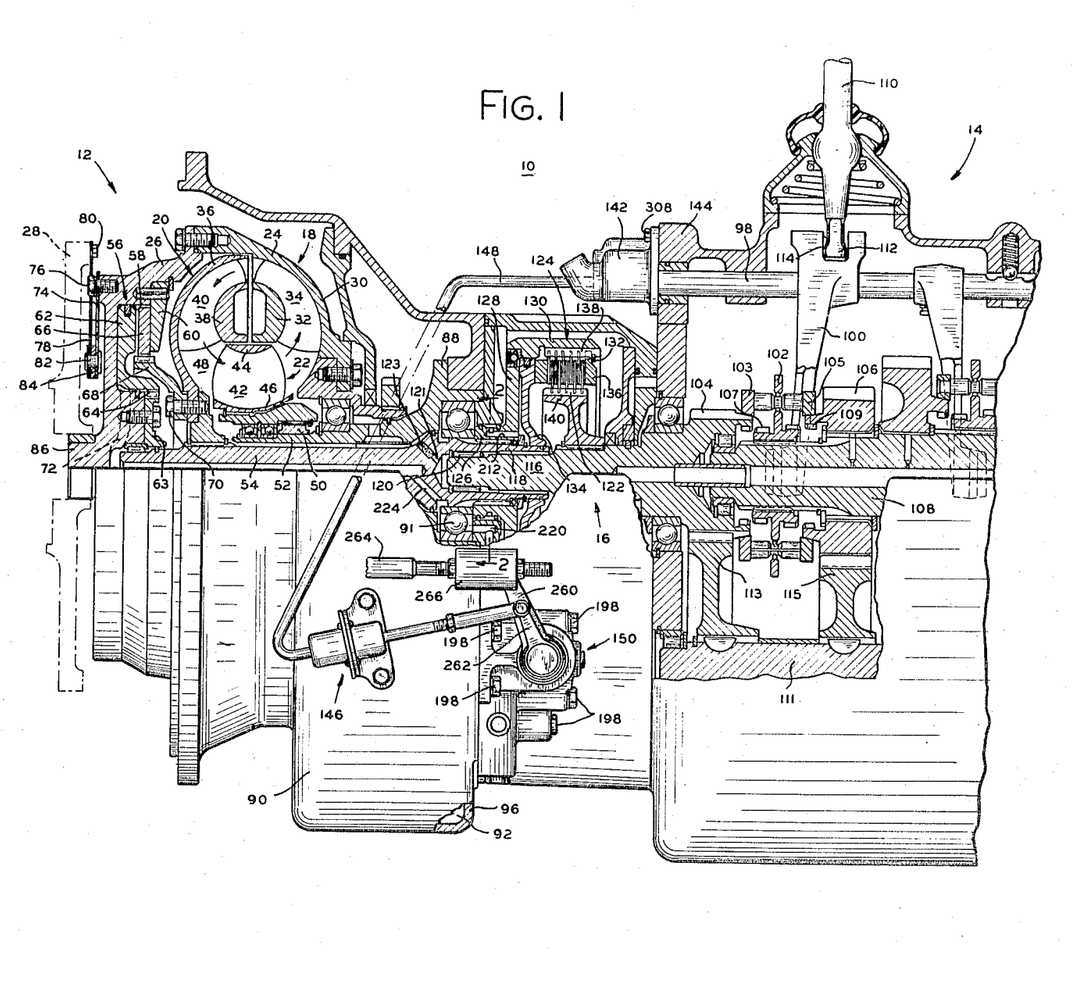
FIGURE 1 shows part of a drive mechanism embodying our invention with the portion above the center line in longitudinal section.
Figures 2, 4, 10:
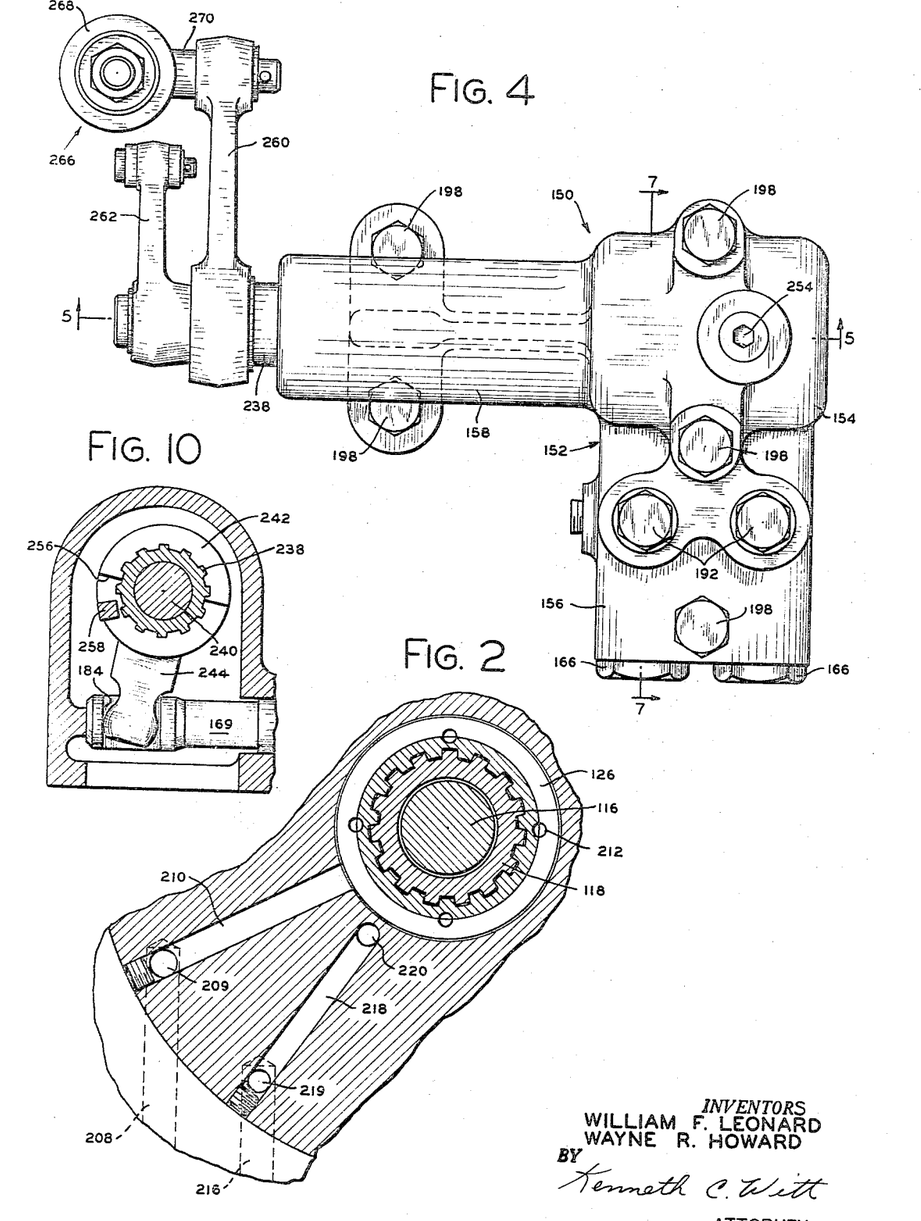
FIGURE 2 is a fragmentary sectional view along line 2—2 of FIGURE 1 showing to advantage some of the passages for conducting fluid to the disconnect clutch and lock-up clutch.
FIGURE 4 is a plan view of the interlocking control valve assembly which forms a part of our invention, along the line 4—4 of FIG. 3.
FIGURE 10 is a sectional view taken along line 10—10 of FIG. 5 showing to better advantage the pin and wipe slot when they are in the position shown in FIG. 8.

Referring now to FIGURE 1, the numeral 10 denotes a drive mechanism comprising a hydrodynamic torque converter 12, a manually operated synchronized gear transmission 14 (only a portion of which is shown) and a fluid actuated disconnect clutch 16 for connecting gear transmission 14 with torque converter 12.

The torque converter 12 is of known type, in its general over-all aspects having three bladed wheels arranged for the flow of liquid through the bladed portion thereof in a toroidal path, the wheels including an impeller wheel 18, a turbine wheel 20 and a reaction member or stator 22. The impeller 18 includes an annular generally dish-shaped portion 24. A connecting member 26 is connected in axial alignment with portion 24.

The member 26 is in the form of a disc having a peripheral portion which follows the outer contour of the turbine 20, and is suitably secured to an engine or other drive means for rotating therewith. An annular plate or flywheel 28 is connected to the connecting member 26 and to the drive means. The impeller 18, as illustrated, comprises a shell 30 of semi-toroidal shape, forming a part of portion 24, an inner core ring 32, and blades 34 extending between and connected to the shell and core ring. The turbine 20 also comprises a semi-toroidal shell 36 and core ring 38 having blades 40 extending and secured to the shell and core ring. The stator 22 comprises blades 42 extending between a core ring 44 and an inner hub or shell portion 46. It will be understood by those skilled in the art that the shell and ring portions of each bladed element above-described are both annular and complete rings, although only portions of said shells and rings are illustrated in FIG. 1. The three bladed elements perform and function as a hydrodynamic torque converter with the blades 34 of the impeller 18 functioning to impart energy to a body of liquid in an annular chamber 48 formed by the vaned wheels, the turbine 20 receiving energy from the fluid and stator 22 being held from rotation and functioning as a reaction element to change the direction of the flow of liquid so that the device functions to multiply torque until such time that the change in the direction of liquid leaving the turbine 20 and entering the stator 22 in the fluid circuit, indicated by the arrows in FIG. 1, causes the stator to be released by a one-way brake 50 between the stator and a stationary reactor sleeve 52 to provide for the operation of the device 12 as a fluid coupling without torque multiplication between the drive means and a driven shaft 54 connected to the turbine 20.

The torque converter 12 also is provided with a fluid actuated disc clutch 56 which serves to lock-up torque converter 12 by connecting impeller 18 and turbine 20 for rotation together. The lock-up clutch 56 is disposed in an annular chamber 58 between member 26 and turbine 20. Lock-up clutch 56 comprises an annular backing plate 60 secured to connecting member 26 by means of a connection including a plurality of pins and a snap ring, an axially movable annular piston 62 splined to an annular plate 63 at 64 which is fixed to connecting member 26 by a plurality of machine screws and an axially movable annular friction plate 66 disposed between piston 62 and backing plate 60 and splined to a plate carrier 68 which, in turn, is secured to turbine 20 by means of a plurality of machine screws 70. A fluid passage 72 in member 26 transmits pressure fluid to the left of piston 62. Admitting pressure fluid to the left of piston 62 in this manner causes the piston to move towards the right, as seen in FIG. 1, thus causing friction plate 66 to be forcefully held in frictional engagement between piston 62 and backing plate 60 so that the three are frictionally locked together.

To provide a driving connection between the flywheel 28 which may be a portion of an engine and the impeller 18, an annular flexible plate 74 which extends radially inwardly from the periphery of member 26 is securely fastened thereto by means of a plurality of machine screws 76. Another annular flexible plate 78 is secured by means of a plurality of machine screws 80 to flywheel 28. The flexible plates 74 and 78 are secured together in spaced relation adjacent the radially inner portions thereof by means of rivets 82 and suitable annular spacers 84. The member 26 is mounted for slight axial movement relative to flywheel 28 by means of an axially projecting hub 86 near the axis thereof. The above-described structure thereby provides an axially flexible connection between the flywheel and the impeller to compensate for expansion due to heat and internal pressure generated within the torque converter. Such connection provides desired flexibility without sacrificing torsional strength in the driving connection. By providing the two flexible plates instead of a single flexible plate, a substantial amount of relative axial movement may be provided for with each plate deflecting only half the amount of the over-all relative axial movement between the flywheel and the impeller housing. If a single flexible plate were used, all of the axial movement would have to be taken up as deflection in the single flexible plate.

The driven shaft 54 of the torque converter 12 extends axially through a hub 88 formed internally of a housing indicated generally by the reference numeral 90 and is journaled therein by a ball bearing 91. The shaft 54 is connected to disconnect clutch 16 in a manner explained in detail hereinafter. The housing 90 contains a reservoir 92, a fluid pump 94 (FIG. 3) and a plurality of fluid passages disposed within an end wall 96.

The gear transmission 14 includes an axially movable shift rail 98 to which is secured a shift fork 100. The shift fork 100 engages a synchronizer clutch assembly 102 having a pair of friction type cone clutches 103 and 105 and a pair of positive type tooth clutches 107 and 109. Clutches 103 and 107 serve to synchronize and then secure gear 104 to an output shaft 108 for rotation therewith, thus providing a direct drive. Clutches 105 and 109 similarly serve to synchronize and secure gear 106 to shaft 108, thus providing a reduced speed via a rotatable countershaft 111 having a pair of gears 113 and 115 secured thereto for rotation therewith and which mesh respectively with gears 104 and 105. A more detailed description of assembly 102 may be found in U.S. Patent No. 2,667,955, dated February 16, 1954, which is assigned to the same assignee as the present application. The shift fork 100 is actuated by means of an operator shift control lever 110 having a shift fork engaging portion 112 at the bottom thereof which registers with a slot 114 in the upper portion of shift fork 100 for actuating same.

The gear 104 preferably is formed integrally with an input shaft 116 which extends axially through disconnect clutch 16, the left end thereof being partially telescoped within a quill portion 118 of the torque converter output shaft 54 where it is journaled in a roller bearing 120.

Fluid for lubricating bearing 120 is supplied through a passage 121. The flow of lubricating fluid to bearing 120 is preferably small, being on the order of three or four drops per minute. In order to provide this small flow a restriction is placed in passage 121. This restriction preferably is a plug 123 of porous material, such as sintered bronze or certain types of ceramics. By using a porous plug 123, a non-clogging orifice is obtained.

The disconnect clutch 16 includes an inner disc carrier 122 splined to transmission input shaft 116 for rotation therewith and an outer disc carrier 124 splined to quill portion 118 of torque converter output shaft 54 for rotation therewith. The outer disc carrier 124 includes a hub portion 126, a radially extending annular flange portion 128 and an elongated axially extending drum portion 130. Disposed within outer disc carrier 124 is an axially movable annular piston 134. Also disposed within outer disc carrier 124 and carried by drum portion 130 is a backing plate 136 held from axial movement by a snap ring 132 and a set of annular friction discs 138. Interleaved with friction discs 138 is a set of friction discs 140 carried by inner disc carrier 122. The two sets of friction discs form a clutch pack disposed between piston 134 and backing plate 136 so that by admitting pressure fluid behind (to the left of) piston 134 the clutch pack is compressed and causes shafts 54 and 116 to be frictionally connected for rotation together, thereby serving to transmit power between torque converter 12 and gear transmission 14.

Figure 3:
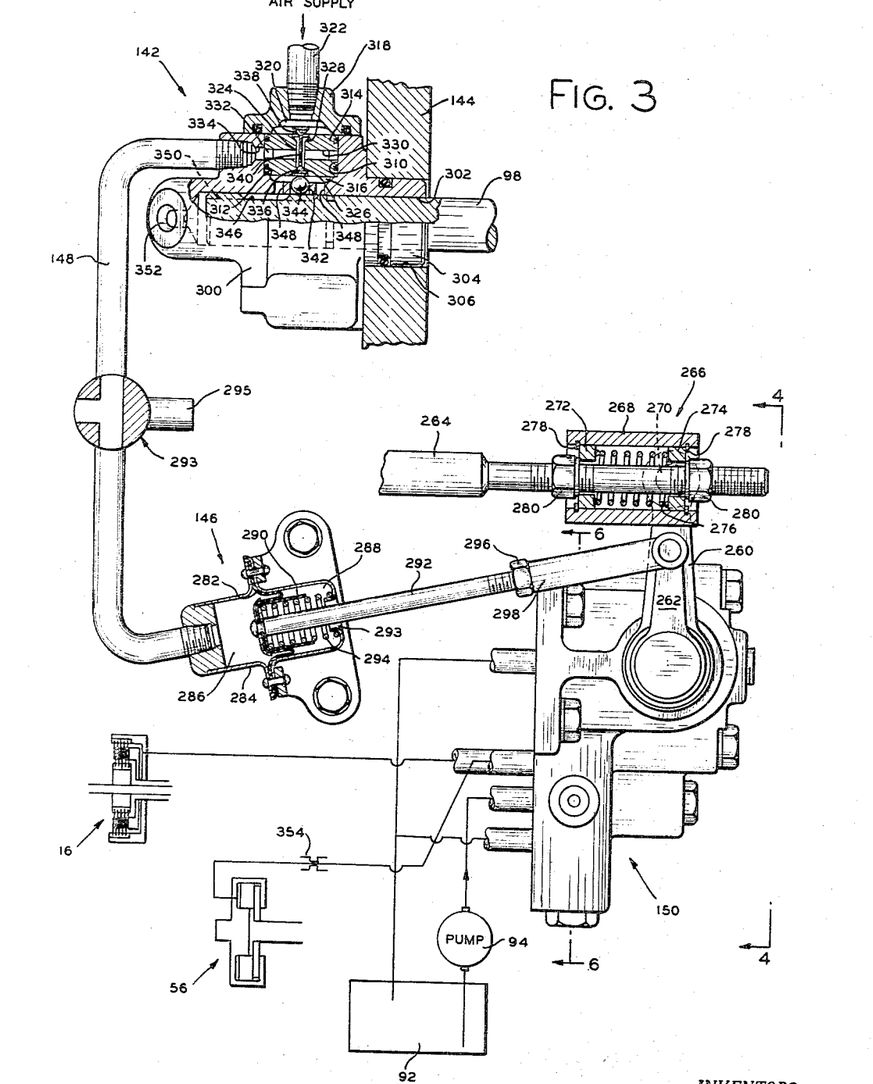
FIGURE 3 is a partially schematized view showing our invention with both of the associated clutches in their engaged position.

Referring now also to FIGURE 3, the control includes a two-position air valve 142 secured to gear transmission housing 144 and responsive to the position of shift rail 98. An air line 148 runs between valve 142 and a single diaphragm type spring release actuator 146 and serves to connect diaphragm actuator 146 either with a source of air pressure or with the atmosphere through valve 142. The actuator 146 is secured to torque converter housing 90 and connected to an interlocking control valve assembly 150 through a mechanical connection. The operation and function of devices 142 and 146 will be explained in greater detail hereinafter.

Referring now to FIGURES 4 through 9, the interlocking control valve assembly 150 includes a housing 152 having a control arm chamber portion 154. Extending at right angles to each other from chamber portion 154 are valve portion 156 and control shaft portion 158. Located within valve portion 156 is a pair of parallel bores 160 and 162 communicating with a control arm chamber 164. The bores 160 and 162 are sealed at their ends opposite control arm chamber 164 by means of cap screws 166.

Figure 7:
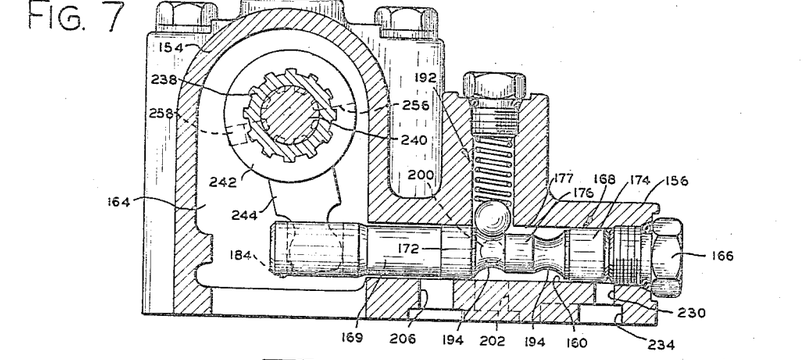
FIGURES 7, 8 and 9 are cross-sections taken along line 7—7 of FIG. 4 showing the condition of the spool valves when both clutches are disengaged, when the disconnect clutch is engaged and the lock-up clutch is disengaged, and when both clutches are engaged, respectively.
Figure 8:
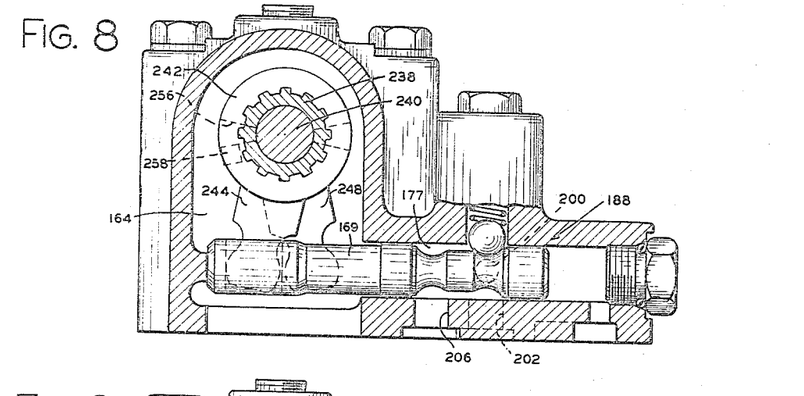

A pair of axially slidable pistons 168 and 170 are disposed respectively in bores 160 and 162 and extend into control arm chamber 164. Piston 168 has a pair of land portions 172 and 174 separated by a smaller diameter annular groove 176. These lands and groove together with bore 160 define an annular chamber 177. Piston 170 is substantially identical to piston 168 and has a pair of land portions 178 and 180 separated by a smaller diameter annular groove 182, all of which together with bore 162 define an annular chamber 183. In addition, a chordal groove 184 is cut in the portion of piston 168 which extends into control arm chamber 164. Piston 170 has a similar groove 186 cut therein. The function of these chordal grooves will be explained hereinafter. The respective pistons and bores cooperate to form a pair of spool valves 188 and 190 which control the communication of pressure fluid which disconnect clutch 16 and lock-up clutch 56, respectively, in a manner to be explained shortly.

Figure 9:
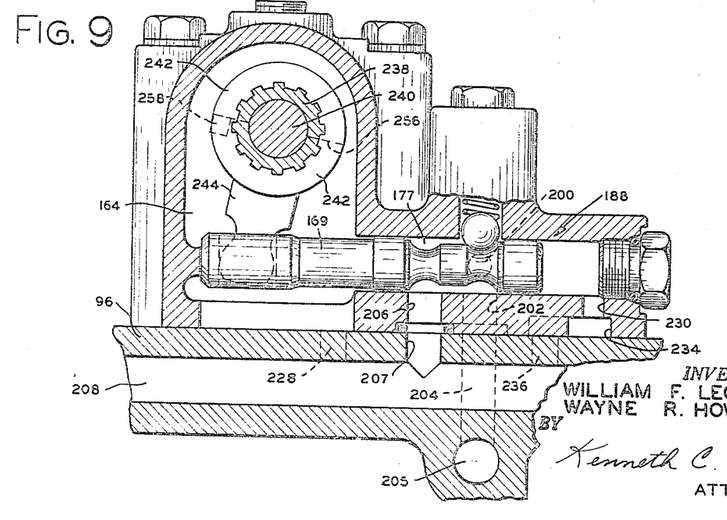

Positive positioning of pistons 168 and 170 is provided by means of a pair of spring loaded ball detents 192 which cooperate with spaced apart annular grooves 194 and 196 in the smaller diameter portions of pistons 168 and 170, respectively, to positively position the pistons in the various positions shown in FIGURES 7 through 9.

The housing 152 of interlocking control valve 150 is secured to end wall 96 of the torque converter housing (FIG. 1) by means of five machine screws 198 and held in fluid sealing relation therewith. The housing 152 is positioned so that various fluid passages therein (FIGS. 6 and 9) register with corresponding fluid passages in end wall 96. Pressure fluid is supplied to annular chambers 177 and 183 by means of a cross passage 200 communicating with bores 160 and 162 and with a fluid passage 202 running between cross passage 200 and the underside of housing 152 where it registers with a port 204 located in end wall 96 in direct communication with fluid pump 94 via passage 205. Pressure fluid is conducted from chamber 177 to disconnect clutch 16 by means of a port 206 located in valve portion 156 of housing 152 and in registry with a port 207 leading to a fluid passage 208 located in end wall 96 which communicates pressure fluid with disconnect clutch 16 via a connecting passage 209 (FIG. 2), a radially inwardly extending passage 210 (FIG. 2) and an axially extending passage 212 (FIG. 1) located in the hub portion 126 of outer disc carrier 124 and which opens into the space in back of piston 134.

Pressure fluid is communicated from chamber 183 to lock-up clutch 56 by means of a port 214 (see FIG. 6) located in housing 152 and registering with a port (not shown) in end wall 96 which communicates with a fluid passage 216 (see FIG. 6) located in end wall 96 which in turn communicates with a radially inwardly extending fluid passage 218 (FIG. 2) via a connecting passage 219. Fluid passage 218 communicates with a short connecting passage 220 (FIG. 1) which opens into ball bearing 91 which serves as a fluid passage and communicates with another fluid passage 224 located in torque converter output shaft 54 and which extends to the end of shaft 54 adjacent passage 72. Fluid passage 224 communicaes in turn with radially extending fluid passage 72 located in member 26 and opening into chamber 58 behind piston 62.

A passage 228 through end wall 96 communicates control arm chamber 164 with the interior of housing 90 and hence reservoir 92. The passage 228 serves, in a manner explained hereinafter, to connect main clutch 16 and lock-up clutch 56 with reservoir 92.

Any fluid which leaks past lands 174 and 180 is drained back to reservoir 92 by means of a pair of fluid passages 230 and 232 connecting bores 160 and 162, respectively, with an arcuate groove 234 in the underside of valve portion 156 which in turn communicates with a port 236 that extends through end wall 96, thereby providing communication between the interior of housing 150 and reservoir 92.

Figure 5:
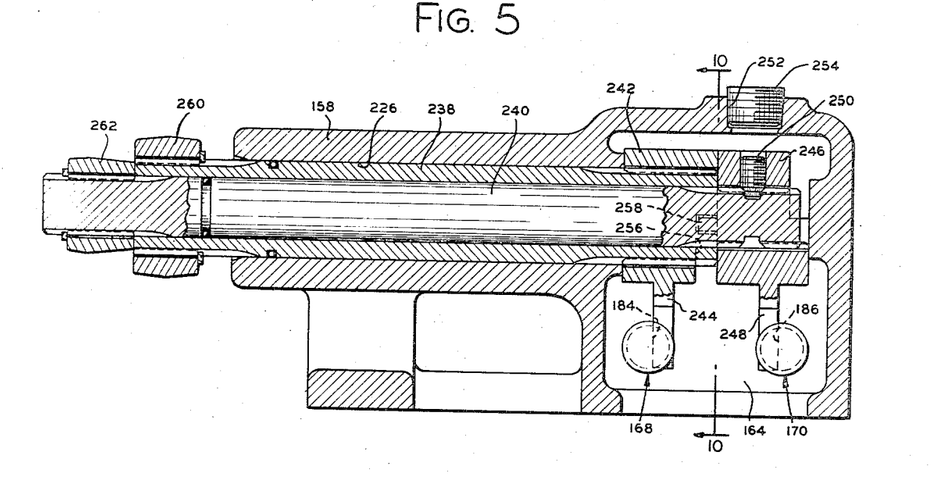
FIGURE 5 is a longitudinal section taken along line 5—5 of FIG. 4.

A bore 225 (FIG. 5) is located in control shaft portion 158 at right angles to and, as viewed in FIG. 5, above bores 160 and 162. Rotatably journaled in bore 226 is a sleeve control shaft 238 which extends into control arm chamber 164 at one end and outwardly of control shaft portion 158 at the other end. Another control shaft 240 is rotatably journaled in sleeve shaft 238 and extends outwardly of sleeve shaft 238 at both ends thereof. Secured respectively to the ends of control shafts 238 and 240 opposite chamber 164 is a pair of lever arms 260 and 262 (best seen in FIGS. 3 and 4). An annular ring 242 having a radially extending arm 244, of the configuration shown in FIG. 7, is disposed in control arm chamber 164 and splined to sleeve control shaft 238. The arm 244 registers with chordal groove 184 in piston 168 so that arcuate movement of arm 244 causes rectilinear movement of piston 168. Piston 170 is similarly connected to control shaft 240 by means of an annular ring 246 having a radially extending arm 248, of the configuration shown in FIG. 8, which registers with chordal groove 186 in piston 170 so that arcuate movement of arm 248 causes a corresponding rectilinear movement of piston 170. Annular ring 246 is splined to control shaft 240 and held in place thereon by means of a set screw 250 to which access can be had through an access hole 252 which normally is plugged by plug 254. The annular rings 242 and 246 are disposed in abbutting relation along confronting ends thereof. The confronting end of annular ring 242 has a wipe slot or chordal groove 256 cut therein which extends approximately to the longitudinal axis thereof. Projecting axially from the confronting end of annular ring 246 is a pin 258 which registers with wipe slot 256, thereby serving to interlock annular rings 242 and 246. From a consideration of FIGS. 5 and 7 through 9, it will be appreciated that wipe slot 256 and pin 258 cooperate with the rings and arms to form an interlocking assembly to interlock pistons 168 and 170 so that whenever piston 168 is in its extreme rightward position, as seen in FIG. 7, then piston 170 must also be in its extreme rightward position due to wipe slot 256 engaging pin 258 and carrying it therealong to the position shown in FIG. 7.

Figure 6:
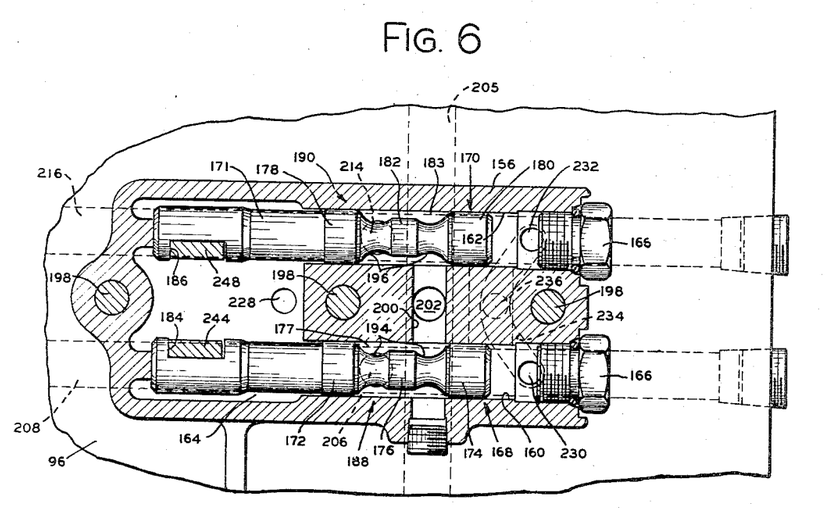
FIGURE 6 is a fragmentary horizontal section taken along line 6—6 of FIG. 3.

The operation of interlocking control valve assembly 150 is such that when piston 168 is in its extreme rightward position (FIG. 7) pressure fluid entering bore 160 through fluid passage 200 is contained within chamber 177. At the same time, the fluid circuit which communicates with disconnect clutch 16 and includes port 206 is in communication with reservoir 92 via bore 160 (around the reduced diameter portion 169 of piston 168), control arm chamber 164 and fluid passage 228. In this position of piston 168 the disconnect clutch 16 is disengaged. Since pistons 168 and 170 are interlocked through wipe slot 256 and pin 258, the piston 170 is held in its extreme rightward position, as viewed in FIG. 7, whenever piston 168 is in its extreme rightward position, as explained above. In this position, piston 170 contains within chamber 183 pressure fluid from fluid passage 200. Also, the fluid circuit which communicates with lock-up clutch 56 and includes port 214 is vented to reservoir 92 by means of bore 162 (around the reduced diameter portion 171 of piston 170), control arm chamber 164 and fluid passage 228. In this position of piston 170 the lock-up clutch 56 is disengaged. Clockwise movement of lever arm 260 from the position in FIG. 3 causes a corresponding movement in radially extending arm 244 which in turn causes piston 168 to move to its extreme leftward position, as seen in FIG. 8, thereby communicating pressure fluid in chamber 177 with port 206 and the remainder of the fluid circuit leading to disconnect clutch 16. When piston 168 is in this position the disconnect clutch 16 is engaged. With piston 168 in the position shown in FIG. 8, clockwise movement of lever arm 262, as viewed from FIG. 1, causes a corresponding movement of radially extending arm 248 which in turn causes piston 170 to move to its extreme leftward position as seen in FIGS. 6 and 9. When piston 170 is in this position pressure fluid in chamber 183 communicates with port 214, and thus is in communication with the remainder of the fluid circuit that leads to lock-up clutch 56. When piston 170 is in this position the lock-up clutch 56 is engaged. It will now be noted that counterclockwise movement of lever arm 260 will return piston 168 to its extreme rightward position (FIG. 7) and disengage disconnect clutch 16. Due to the cooperation of wipe slot 256 and pin 258 interlocking pistons 168 and 170, the piston 170 simultaneously will be moved from its extreme leftward position to its extreme rightward position upon counterclockwise movement of lever arm 260, and thus disengage lock-up clutch 56.

Referring to FIG. 3, the lever arm 260 is connected to a clutch foot pedal (not shown) by means of a rod 264 and an overtravel connector 266 pivotally connected to lever arm 260. The overtravel connector 266 includes an elongated sleeve member 268 pivotally connected to lever arm 260 by means of a stub shaft 270 which is secured at one end to sleeve 268 by any suitable means, such as welding. Disposed within sleeve 268 is a pair of annular rings 272 and 274 located in axially spaced relation to each other. Disposed, intermediate rings 272 and 274 is a helical spring 276. The rings and spring are held within sleeve 268 by means of a pair of snap rings 278 in such a manner that spring 276 is under compression and therefore tends to urge rings 272 and 274 outwardly, and thus holds them tightly against snap rings 278. Rod 264 passes through annular rings 272 and 274 and is secured to overtravel connector 266 by means of a pair of nuts 280 threadably mounted on rod 264 and abutting annular rings 272 and 274 outwardly thereof. Actuation of rod 264, as seen in FIG. 1, to the right initially results in a clockwise movement of lever arm 260 to the position shown in FIG. 3. Further rightward movement of rod 264 will not result in a further clockwise movement of lever arm 260 since it has reached its extreme position and is prevented from further movement by piston 168 abutting control arm chamber portion 154; therefore, such further movement of rod 264 causes a rightward movement of annular ring 272 which results in further compressing spring 276. As will be appreciated the overtravel connector 266 provides a means for preventing bending or breaking of lever arm 260 by excessive displacement of rod 264. Leftward movement of rod 264 causes a counterclockwise movement of lever arm 260 from the position shown in FIG. 3 to the position shown in FIG. 1. Further leftward movement of rod 264 will not result in a further movement of lever arm 260 because piston 168 is in abutment with cap screw 166, but will cause annular ring 274 to move to the left thus compressing spring 276.

The lever arm 262 is connected to diaphragm actuator 146 which is secured to the torque converter housing 90. Actuator 146 includes a flexible diaphragm 282 which separates a valve body 284 into an air chamber 286 and a spring retaining chamber 288. Secured to flexible diaphragm 282 is a cup-shaped spring retainer 290 and an actuating rod 292 which extends outwardly of actuator body 284 through an opening 293. A helical spring 294 is disposed between flexible diaphragm 282 and body 284 and within spring retainer 290. The end of actuating rod 292 opposite the flexible diaphragm 282 is threaded to receive a lock nut 296 and is threadably connected to connecting sleeve 298 which is pivotally connected at one end to lever arm 262. Varying the extent to which actuating rod 292 is threaded into sleeve 298 determines the relative positions of actuating rod 292 and lever arm 262 in order to correct for minor variations in the dimensions and positioning of the parts. Admission of air under pressure into chamber 286 overcomes the bias of spring 294 and actuates rod 292 to the right to the position shown in FIG. 3, thus moving lever arm 262 clockwise. As will be explained hereinafter, lever arm 262 normally will be actuated to the position of FIG. 1 against the force of air prior to the relieving of air pressure in actuator 146.

In some situations it may be desirable for the lock-up clutch 56 to be disengaged when air valve 142 is supplying air under pressure to air line 148. To this end, a rotary valve 293 (shown in FIG. 3 only) is disposed in air line 148 and serves as a part of air line 148 in one position (FIG. 3) while in another position it seals air line 148 to the supply of air under pressure from air valve 142 and vents chamber 286 to the atmosphere via conduit 295 with the result that spring 294 expands and moves rod 292 leftward to the position shown in FIG. 1 wherein the lock-up clutch 56 is disengaged.

The supply of air under pressure to chamber 286 of diaphragm actuator 146 is controlled by the two-position air valve 142. The two-position air valve 142 includes a valve body 300 having a bore 302 therein which slidably receives shift rail 98. The valve body 300 is mounted on transmission housing 144 by means of an annular projection 304 which registers with a hole 306 in housing 144 and is secured thereto by means of machine screws 308 (FIG. 1). Located in valve body 300 is another bore 310 at right angles to bore 306. Bore 310 has a shoulder 312 near the bottom thereof so that a chamber 316 is formed between the bottom of bore 310 and an annular insert 314. A cover 318 is secured to valve body 300 and forms with insert 314 another chamber 320. The chamber 320 is in constant communication with air under pressure by means of an air line 332. A passage 324 runs between chambers 316 and 320 centrally of insert 314 and has a pair of miter valve seats 326 and 328 at opposite ends thereof. Another passage 330 which intersects passage 324 runs through insert 314 at right angles to passage 324 and communicates with an annular groove 332 in the periphery of insert 314. Annular groove 332 communicates with air line 148 by means of a port 334 in valve body 300.

A pair of miter valve members 336 and 338 arranged to seat respectively in miter valve seats 326 and 328 are rigidly connected by a rod 340 which passes through and is of a smaller diameter than passage 324. The length of rod 340 is such than when one of the miter valves is seated or closed the other miter valve is unseated or open.

An annular opening 342 connects bores 302 and 310 and has slidably disposed therein a ball 344. Ball 344 abuts miter valve member 336 and cooperates with a groove 346 in shift rod 98 in a manner to be explained hereinafter. Bore 310 also is in communication with bore 302 and groove 346 by means of passages 348. Groove 346 communicates with the atmosphere by means of a communicating groove 350 and an opening 352 in valve body 300. When shift rail 98 is disposed so that neither gear 104 nor 106 is connected to output shaft 108 the ball 344 is disposed in groove 346, and therefore miter valve member 338 is seated in seat 328 due to the air pressure thereon. At the same time, miter valve member 336 is unseated from seat 326 with the result that port 334, and thus air chamber 286 of actuator 146 is in communication with the atmosphere through opening 352. When shift rail 98 is shifted to connect either gear 104 or gear 106 to output shaft 108 the ball 344 is forced out of groove 346 and up onto the outer periphery of shift rail 98 with the result that miter valve member 338 is unseated, and therefore air under pressure is communicated to port 334 and hence chamber 286. At the same time, miter valve member 336 is seated in seat 326, and thus prevents the escape of any air under pressure to the atmosphere through opening 352.

We will now describe the operation of our invention. Assume that a vehicle having a transmission embodying our invention is traveling in third gear ratio and that shift rail 98 controls the fourth and fifth gear ratios for the vehicle. Further assume that the operator desires to shift from third gear ratio into fourth gear ratio. The operator first depresses the clutch pedal (not shown) which actuates lever arm 260 in a counterclockwise direction through overtravel connector 266 and moves piston 168 to its rightmost position (FIG. 7). In this position the fluid circuit communicating with disconnect clutch 16 is in communication with reservoir 92 through bore 160, control arm chamber 164 and passage 228 as explained above. Since no pressure fluid is being communicated to disconnect clutch 16, it moves to its disengaged condition. In order to engage fourth gear ratio, the operator now actuates shift control lever 110 so that synchronizer-clutch assembly 102 connects gear 106 with output shaft 108. This operation causes shift rail 98 to move to the right, as viewed in FIGS. 1 and 3. Rightward movement of shift rail 98 causes valve 142 to communicate air under pressure to chamber 286 of actuator 146 via air line 148, thus energizing diaphragm actuator 146. The air under pressure in chamber 286 tends to urge rod 292 to the position shown in FIG. 3; however, since the disconnect clutch 16 is not yet engaged, the lever arm 260 is still in the position shown in FIG. 1, and so the lever arm 262 is maintained in a similar position due to the interlocking of spool valves 188 and 190 by means of wipe slot 256 and pin 258. In order to complete the shift, the operator reengages disconnect clutch 16 by releasing the clutch pedal which actuates lever arm 260 in a clockwise direction to the position shown in FIG. 3. Actuation of lever arm 260 in a clockwise direction also allows lever arm 262 to move in a clockwise direction due to the urging of diaphragm valve 146 because wipe slot 256 moves away from pin 258 when lever arm 260 is actuated in the clockwise direction. As has been pointed out previously, the engagement of disconnect clutch 16 must precede engagement of lock-up clutch 56. Therefore, since the actuation of both clutches to their engaged conditions begins simultaneously, means must be provided for actuating lock-up clutch 56 more slowly than disconnect clutch 16. As will be noted from a reference to FIGS. 1 and 2, the fluid circuit leading to lock-up clutch 56 is more tortuous and contains smaller diameter passages than the fluid circuit leading to disconnect clutch 16. Also, the chamber behind piston 62 for lock-up clutch 56 is larger than the chamber behind piston 134, and therefore more fluid is required to engage clutch 56 than to engage clutch 16. The result of the combination of tortuous and narrow passages and a larger chamber for lock-up clutch 56 causes lock-up clutch 56 to lag about ½ of a second behind disconnect clutch 16 in engagement time. The desired time lag depends upon job application and other factors, and so may be made as long as two seconds in some cases. This means for causing clutch 56 to lag behind disconnect clutch 16 in engagement time has been shown in FIG. 3 as an orifice 354 located in the fluid circuit leading to lock-up clutch 56 which, obviously, could be utilized if the other means gave an insufficient time lag in the engagement of lock-up clutch 56.

In shifting from fourth to fifth gear ratio, the operator initially disengages disconnect clutch 16 by depressing the clutch pedal which actuates lever arm 260 counterclockwise to the position shown in FIG. 1. Actuation of lever arm 260 to the position in FIG. 1 also causes lever arm 262 to move from the position shown in FIG. 3 to the position in FIG. 1 against the force of actuator 146 due to the interlocking of spool valves 188 and 190 by wipe slot 256 and pin 258, thus disengaging both disconnect clutch 16 and lock-up clutch 56. The remainder of the operation is similar to shifting from third to fourth gear ratio, except that shift rail 98 is moved towards the left to the position shown in FIG. 3, whereby gear 104 is connected to shaft 108.

To summarize, in a drive mechanism including a hydrodynamic torque converter and a synchronized change speed gear transmission connected in series therewith, a disconnect clutch must be provided between the torque converter and the gear transmission because of the low capacity of the synchronizing clutch means for the gear transmission, as explained hereinbefore. By taking advantage of inherent synchronization and shock absorbtion characteristics of the torque converter, the disconnect clutch need not have as great a capacity as otherwise would be required if a torque converter were not located in front of the disconnect clutch in the drive line, for the reasons set forth above. In the case where the torque converter is provided with a lock-up clutch to take it out of the drive line under certain operating conditions, it is important that provision be made to insure that the lock-up clutch is disengaged when the disconnect clutch is reengaged so that the torque converter will perform the functions of synchronization and shock absorption. In view of the above-detailed description, it will be readily apparent that we have disclosed a control apparatus which insures that the lock-up clutch in such a drive mechanism will not be engaged during engagement of the disconnect clutch, whereby the torque converter absorbs the shock of engaging the disconnect clutch. It will also be seen that our control apparatus also provides means for automatically locking up the torque converter whenever the gear transmission is shifted into certain gear ratios as is desirable under certain operating conditions.

The preferred embodiment of our invention described above in the detailed description is merely illustrative and should not be construed in any sense as limiting. The scope of our invention should be determined from the following appended claims when taken in view of the prior art.

We claim:

1. For use with a drive mechanism having a first fluid actuated friction device, a second fluid actuated friction device and a movable shift rail, a control apparatus comprising a first valve for connecting the first friction device with a source of fluid pressure, a second valve for connecting the second fluid device with the source of fluid pressure, means for preventing said first valve from connecting the first friction device with the source of fluid pressure unless the second friction device is in communication with the source of fluid pressure, means responsive to the position of the shift rail for actuating said first valve to connect said first friction device with the source of fluid pressure, and means for actuating the first friction device more slowly than the second friction device.

2. For use with a drive mechanism having a fluid actuated disconnect clutch, a fluid actuated lock-up clutch, a source of fluid pressure, a reservoir and a movable shift rail, a control apparatus comprising an interlocking control valve assembly having a pair of valve means, one of said valve means being operative to connect the disconnect clutch selectively with the source of fluid pressure or the reservoir, the other of said valve means being operative to connect the lock-up clutch selectively with the source of fluid pressure or the reservoir, and means interlocking said pair of valve means so that said other valve means communicates the lock-up clutch with the reservoir when said one valve means communicates the disconnect clutch with the reservoir, means responsive to the position of the shift rail for actuating said other valve means to comunicate the lock-up clutch with the source of fluid pressure, and means for causing the lock-up clutch to lag behind the disconnect clutch in engagement.

3. For use with a drive mechanism having a first fluid actuated friction device, a second fluid actuated friction device and a movable shift rail, a control apparatus comprising an interlocking control valve assembly having a first valve for connecting the first friction device with a source of fluid pressure, a second valve for connecting the second friction device with the source of fluid pressure, a rotatable control shaft operatively connected to said first valve, a rotatable control shaft operatively connected to said second valve, interlocking means for preventing said first valve from connecting said first friction device to the source of fluid pressure unless the second friction device is in communication with the source of fluid pressure, said interlocking means including a wipe slot associated with the control shaft for said second valve and a pin in registry with said wipe slot and associated with the control shaft for said first valve, means responsive to the position of the shift rail for actuating said first valve to connect the first friction device with the source of fluid pressure, and means for engaging said first friction device slower than said second friction device.

4. For use with a drive mechanism having a fluid actuated disconnect clutch, a fluid actuated lock-up clutch and a source of fluid pressure, the combination of valve means for communicating the disconnect clutch with fluid pressure, valve means for communicating the lock-up clutch with fluid pressure, means for preventing the last-mentioned valve means from communicating the lock-up clutch with fluid pressure unless the first-mentioned valve means is communicating the disconnect clutch with fluid pressure, and means for causing the lock-up clutch to engage more slowly than the disconnect clutch.

5. For use with a drive mechanism including a hydrodynamic torque converter having an impeller member and a turbine member, a fluid actuated lock-up clutch for connecting the impeller and turbine members for rotation together, a gear transmission having a movable shift rail, a fluid actuated disconnect clutch for connecting the torque converter with the gear transmission, a fluid pump and a fluid reservoir, a control apparatus comprising a fluid passage means communicating with the said lock-up clutch, fluid passage mean communicating with the said disconnect clutch, an interlocking control valve assembly having a pair of valve means, one of said valve means having a first position operative to connect said disconnect clutch fluid passage means with the fluid pump and a second position operative to connect said disconnect clutch fluid passage means with the reservoir, the other of said valve means having a first position operative to communicate said lockup clutch fluid passage means with the fluid pump and a second position operative to communicate said lock-up clutch fluid passage means with the reservoir, and means interlocking said pair of valve means so that when said one valve means is in its second position said other valve means also is in its second position, means responsive to the position of the shift rail for actuating said other valve means to either its first or second position, and means including said fluid passage means for causing the said lock-up clutch to engage more slowly than the said disconnect clutch.

6. For use with a drive mechanism having a fluid actuated disconnect clutch, a fluid actuated lock-up clutch, a source of fluid pressure, a reservoir and a movable shift rail, a control apparatus comprising an interlocking control valve assembly having a first spool valve for connecting the disconnect clutch selectively with the source of fluid pressure or the reservoir, a second spool valve for connecting the lock-up clutch selectively with the source of fluid pressure or the reservoir, a first rotatable control shaft, a second rotatable control shaft journaled within said first control shaft, an interlocking assembly including a first ring secured to said first control shaft and having a radially extending arm operatively connected to said first spool valve, a second ring secured to said second control shaft and having a radially extending arm operatively connected to said second spool valve, said first and second rings having confronting ends, a wipe slot in the confronting end of said first ring and a pin secured to the confronting end of said second ring in registry with said wipe slot, said wipe slot and pin cooperating to prevent said second spool valve from connecting the lock-up clutch to the source of fluid pressure unless the first spool valve is communicating the disconnect clutch with the source of fluid pressure, means responsive to the position of the shaft rail for actuating said second spool valve to communicate the lock-up clutch with the source of fluid pressure, and means for actuating the lock-up clutch slower than the disconnect clutch.

7. In combination, a first fluid actuated friction device, a second fluid actuated friction device, fluid pressure generating means, first valve means for communicating said first friction device with fluid pressure from said generating means, second valve means for communicating said second friction device with fluid pressure from said generating means, means for preventing said first valve means from communicating said first friction device with fluid pressure from said generating means unless said second friction device is in communication with fluid pressure from said generating means, and means for causing said first friction device to be actuated more slowly than said second friction device.

References Cited by the Examiner

UNITED STATES PATENTS

| | | | |
|---|---|---|---|
| 2,163,883 | 6/1939 | Kliesrath | 74—340 |
| 2,263,400 | 11/1941 | Schwarz | 192—.073 |
| 2,884,806 | 5/1959 | Tuck | 74—732 |
| 2,919,680 | 1/1960 | Scharringhausen | 137—622 |
| 3,004,446 | 10/1961 | Flinn. | |
| 3,039,326 | 6/1962 | Christenson | 74—688 |
| 3,061,058 | 10/1962 | Barth | 74—745 |
| 3,090,473 | 5/1963 | Askins | 192—13 |

DAVID J. WILLIAMOWSKY, *Primary Examiner.*

DON A. WAITE, *Examiner.*

T. C. PERRY, *Assistant Examiner.*

UNITED STATES PATENT OFFICE
CERTIFICATE OF CORRECTION

Patent No. 3,313,181                            April 11, 1967

William F. Leonard et al.

It is hereby certified that error appears in the above numbered patent requiring correction and that the said Letters Patent should read as corrected below.

Column 3, line 4, for "rotating" read -- rotation --; column 4, line 28, for "105" read -- 106 --; column 7, line 8, after "in" insert -- FIG. 1 to the position in --; column 12, line 31, for "shaft" read -- shift --.

Signed and sealed this 14th day of November 1967.

(SEAL)
Attest:

Edward M. Fletcher, Jr.                          EDWARD J. BRENNER
Attesting Officer                                     Commissioner of Patents